United States Patent
Mlinar et al.

(10) Patent No.: US 12,551,822 B2
(45) Date of Patent: Feb. 17, 2026

(54) PROCESS FOR RECOVERY OF PYROLYSIS OIL EXTRACTION SOLVENT

(71) Applicant: UOP LLC, Des Plaines, IL (US)

(72) Inventors: Anton N. Mlinar, Vernon Hills, IL (US); Stanley J. Frey, Palatine, IL (US); Geoffrey W. Fichtl, Chicago, IL (US); Matthew C. Cole, Evanston, IL (US); Charles P. Luebke, Mount Prospect, IL (US); Joe R. Haas, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 312 days.

(21) Appl. No.: 18/296,457

(22) Filed: Apr. 6, 2023

(65) Prior Publication Data
US 2024/0010937 A1    Jan. 11, 2024

Related U.S. Application Data

(60) Provisional application No. 63/367,839, filed on Jul. 7, 2022.

(51) Int. Cl.
*C10G 53/04* (2006.01)
*B01D 3/14* (2006.01)
(Continued)

(52) U.S. Cl.
CPC .......... *B01D 3/343* (2013.01); *B01D 3/143* (2013.01); *B01D 3/148* (2013.01); *B01D 3/34* (2013.01);
(Continued)

(58) Field of Classification Search
CPC .. C10G 21/28; C10G 1/006; C10G 1/04–047; C10G 53/04
See application file for complete search history.

(56) References Cited

U.S. PATENT DOCUMENTS 2,472,499 A * 6/1949 Stone ............... C10G 21/28
                                                        208/321
3,239,456 A * 3/1966 Woodle et al. ........ C10G 21/28
                                                        208/321
(Continued)

FOREIGN PATENT DOCUMENTS

EP          1752511 A1     2/2007
WO     2012030492 A2      3/2012
(Continued)

OTHER PUBLICATIONS

"Frequently Asked Questions Methyl Isobutyl Ketone", Delaware Health and Social Services, Sep. 2013.*
(Continued)

*Primary Examiner* — Jonathan Luke Pilcher

(57) ABSTRACT

A solvent stripping process has been developed for separating the pyrolysis oil in an extracted phase feed stream from an organic solvent used for extraction. The process involves using a stripping solvent to strip the organic solvent from the pyrolysis oil in a stripping column. The stripping column bottom stream comprising the pyrolysis oil and part of the stripping solvent can be separated into a vapor stream comprising the stripping solvent and a liquid stream comprising the pyrolysis and a portion of the stripping solvent. The stripping column overhead stream comprising the stripping solvent and the organic solvent can be separated in a recovery column into a recovery column overhead stream comprising the stripping solvent and a recovery column bottom stream comprising the organic solvent.

19 Claims, 1 Drawing Sheet

(51) Int. Cl.
- *B01D 3/34* (2006.01)
- *C10B 53/02* (2006.01)
- *C10C 5/00* (2006.01)
- *C10G 21/28* (2006.01)

(52) U.S. Cl.
CPC ............... *C10C 5/00* (2013.01); *C10G 21/28* (2013.01); *C10G 53/04* (2013.01); *C10B 53/02* (2013.01); *C10G 2300/1011* (2013.01)

(56) References Cited

U.S. PATENT DOCUMENTS

| | | | | |
|---|---|---|---|---|
| 3,287,260 A * | 11/1966 | Gross | | C10G 21/28 585/839 |
| 4,209,647 A * | 6/1980 | Gallivan | | C07C 37/005 568/762 |
| 4,233,465 A * | 11/1980 | Gallivan | | C08G 16/0293 568/762 |
| 4,315,815 A * | 2/1982 | Gearhart | | B01D 3/38 203/40 |
| 4,942,269 A * | 7/1990 | Chum | | C07C 37/005 528/1 |
| 5,223,601 A * | 6/1993 | Chum | | C08G 8/28 428/529 |
| 5,536,856 A * | 7/1996 | Harrison | | B01J 8/226 261/114.5 |
| 6,030,524 A * | 2/2000 | Savage | | C10G 7/10 208/356 |
| 6,045,762 A * | 4/2000 | Chuang | | B01D 3/008 422/607 |
| 7,091,367 B2 * | 8/2006 | Moritz | | B01J 19/32 554/170 |
| 7,329,774 B2 * | 2/2008 | Zuber | | C07C 67/08 560/231 |
| 7,481,981 B2 * | 1/2009 | Moritz | | B01J 8/0426 554/170 |
| 8,105,399 B2 * | 1/2012 | Morgan | | C10L 1/026 44/388 |
| 8,123,822 B2 * | 2/2012 | Morgan | | C10L 1/026 44/388 |
| 8,449,629 B2 * | 5/2013 | Morgan | | C07C 41/09 554/170 |
| 8,641,787 B2 * | 2/2014 | Morgan | | C11C 3/00 44/388 |
| 8,901,344 B2 * | 12/2014 | Peters | | B01D 3/38 560/99 |
| 2009/0301930 A1 | 12/2009 | Brandvold et al. | | |
| 2013/0204062 A1 | 8/2013 | Van Wees | | |
| 2019/0330540 A1 | 10/2019 | Gajjela et al. | | |

FOREIGN PATENT DOCUMENTS

| | | |
|---|---|---|
| WO | 2018015768 A1 | 1/2018 |
| WO | 2021211525 A1 | 10/2021 |

OTHER PUBLICATIONS

Ljudmila Fele Žilnik, Alma Jazbinšek, Recovery of renewable phenolic fraction from pyrolysis oil, Separation and Purification Technology, vol. 86, 2012, pp. 157-170, ISSN 1383-58666, https://doi.org/10.1016/j.seppur.2011.10.040.*

International Search Report from corresponding PCT application No. PCT/US2023/026854 mailed Oct. 27, 2023.

Written Opinion from corresponding PCT application No. PCT/US2023/026854 mailed Oct. 27, 2023.

* cited by examiner

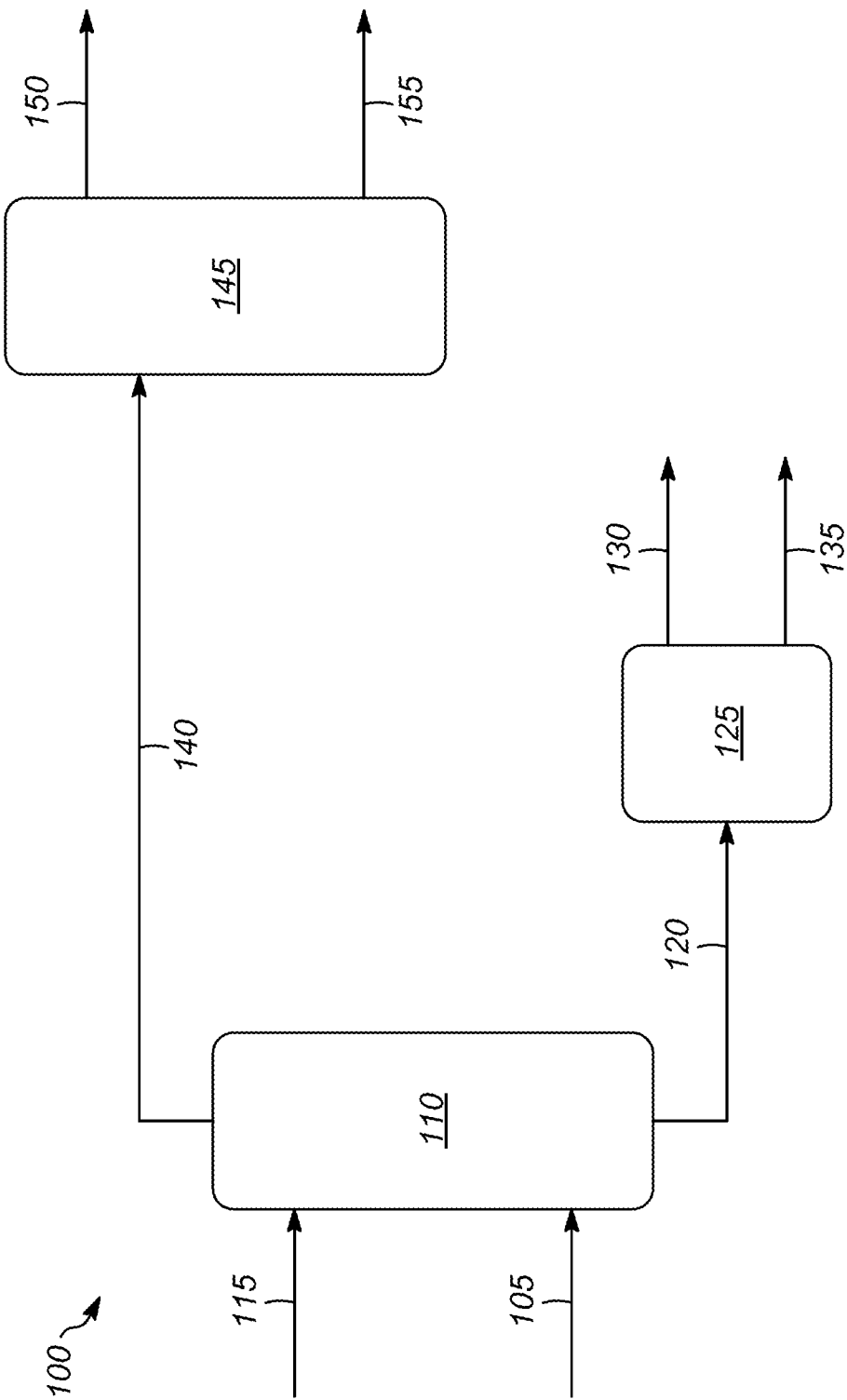

PROCESS FOR RECOVERY OF PYROLYSIS OIL EXTRACTION SOLVENT

RELATED APPLICATIONS

This application claims priority to U.S. Provisional Patent Application Ser. No. 63/367,839 filed on Jul. 7, 2022, the entirety of which is incorporated herein by reference.

BACKGROUND

Pyrolysis is a thermal process during which solid carbonaceous biomass feedstock, i.e., "biomass", such as wood, agricultural wastes/residues, algae, forestry byproducts, cellulose and lignin, municipal waste, construction/demolition debris, or the like, is rapidly heated to pyrolysis temperatures of about 300° C. to about 900° C. in the absence of air using a pyrolysis reactor. A modern form of pyrolysis, or rapid thermal conversion, is conducted under moderate temperatures, typically 400 to 600° C., and short residence times of less than 5 seconds. An example is Rapid Thermal Processing (RTP) that operates under such conditions producing solid and gaseous pyrolysis products. The gaseous pyrolysis products ("pyrolysis gases") comprise a non-condensable portion and a condensable portion (vapors) that can be condensed into liquid biomass-derived pyrolysis oil. Biomass-derived pyrolysis oil can be burned directly as fuel for certain boiler and furnace applications and can also serve as a potential feedstock in catalytic processes for the production of fuels in petroleum refineries. Biomass-derived pyrolysis oil has the potential to replace up to 60% of transportation fuels, thereby reducing the dependency on conventional petroleum and reducing its environmental impact.

However, biomass-derived pyrolysis oil is a complex, highly oxygenated organic liquid defined and used herein as containing molecules comprised of hydrogen, carbon, and oxygen. Specifically, the oxygenates in the pyrolysis oil can contain any number of moieties including, but not limited to, lignin fragments, aldehydes, carboxylic acids, phenols, furans, sugars, alcohols, and ketones, as well as water. Conventional biomass-derived pyrolysis oil comprises about 20% or greater by weight oxygen from these oxygenated hydrocarbons and about 20 to about 30% by weight water with high acidity (e.g., total acid number (TAN) greater than 100). It is the presence of many of these species that impart properties of the pyrolysis oil that limit its utilization as a biofuel. For example, biomass-derived pyrolysis oil has high acidity and a low energy density attributable in large part to oxygenated hydrocarbons in the oil, which can undergo secondary reactions during storage particularly if the oil is stored at elevated temperatures.

One way to stabilize pyrolysis oil to make it more stable for biofuel and chemical conversion is to treat the oil with different solvents to selectively remove the most reactive and troublesome oxygenated species from the oil. One example of this is taught by US 2019/0330540 where a solvent/anti-solvent scheme is devised to remove the most reactive oxygenates and sugars from the pyrolysis oil. In doing so, the remaining pyrolysis oil is more thermally stable and therefore more suitable for further processing into various products. However, the extraction solvent used in this process is expensive and should be recovered to improve the economic viability of the process. Therefore, there is a need for a process to recover an extraction organic solvent from an extracted phase feed stream comprising pyrolysis oil and the organic solvent.

BRIEF DESCRIPTION OF THE DRAWING

The FIGURE illustrates one embodiment of a process according to the present invention.

DETAILED DESCRIPTION

Pyrolysis oil can be upgraded in a hydrotreater to produce sustainable jet and diesel fuels. However, as discussed above, pyrolysis oil is very thermally unstable due to the large nature of oxygenate moieties present in the oil. The maximum process temperature is currently understood to be about 65° C. This thermal instability puts significant constraints on the hydrotreater as well as the choice of separation processes.

There are a number of processes for treating pyrolysis oil to improve its stability. One example of an extraction process involves introducing an organic solvent and water to the pyrolysis oil to force a phase separation. One phase contains the pyrolysis oil and most of the organic solvent and is herein referred to as Advanced Pyrolysis Oil (APO). The other phase contains water and the most hydrophilic oxygenate species. The organic solvent needs to be recovered from this extracted APO phase for the process to be economically viable.

The simplest choice is a simple vacuum flash drum. However, this requires operating below 5 kPa (50 mbar) to recover an acceptable amount of organic solvent. Given the uncertainty in the bio-oil components based on initial feed content and processing conditions, as well as the difficulty in developing thermodynamic models, the use of a flash drum has limited process flexibility, particularly if the results differ from the models. The discrepancies would manifest themselves in lower organic solvent recovery from the APO, resulting in higher make-up costs.

Another possibility is a steam stripping process. However, because of the highly hydrophobic nature of some of the molecules present in the pyrolysis oil/organic solvent mixture, there is the risk of forming two liquid phases in the stripping column. This would present significant design and operating challenges including the possibility of equipment fouling as the extracted hydrophobic molecules crash out of solution.

In order to provide a suitable separation process, a solvent stripping process has been developed. The process involves using a stripping solvent to strip the organic solvent from the organic extracted oil so that the oil (with some residual stripping solvent) is ready for upgrading in a downstream hydrotreater. Although it is more expensive than the flash drum alternative because of the additional equipment needed, the stripping column design has more process flexibility (e.g., stripping solvent rate, pressure, and temperature can all be varied) than is possible in the single stage flash drum separation. This flexibility can be important because of the complexity of the pyrolysis oil and the variability of the content of the feed to the pyrolysis process. The solvent stripping process allows optimization even if the pyrolysis feed and/or thermodynamics do not match the modeling exactly, and it will help ensure successful operation of the process.

The FIGURE illustrates one embodiment of the process 100 for recovering the pyrolysis oil extraction solvent. As shown, the extracted phase feed stream 115 comprising the APO and the organic solvent is fed to the stripping column 110 through an inlet. Typically, the extracted phase feed stream feeds the near the top of the stripping column, for example, above the column internals, although other locations lower in the column could also be used as long as the inlet is above the inlet for the stripping solvent.

The organic solvent should be hydrophobic. It should have an atmospheric boiling point below the boiling point of most of the components of the pyrolysis oil to limit thermal pyrolysis oil degradation during solvent recovery. For example, it could be less than 200° C., or less than 190° C., or less than 180° C., or less than 170° C., or less than 160° C., or less than 150° C., or less than 140° C., or less than 130° C. It is desirable that the organic solvent selected results in the overhead stream of the stripping column containing about 50% or more of the organic solvent and the bottom stream containing 50% or more of the pyrolysis oil. Suitable organic solvents include, but are not limited to, $C_4$-$C_8$ monohydric alcohols, $C_2$-$C_8$ alcohol esters, diethyl ether, derivatives, thereof, or mixtures thereof. Particularly suitable organic solvents include, but are not limited to, n-butyl acetate, ethyl acetate, propyl acetate, methyl isobutyl ketone, derivatives thereof, or combinations thereof.

The stripping vapor feed stream 105 is fed to the stripping column through an inlet. Typically, the stripping solvent feeds near the bottom of a stripping column 110, for example below the column internals, although other locations higher in the column could also be used as long as the inlet is below the inlet for the extracted phase feed stream.

The stripping solvent can be any light hydrocarbon solvent that is capable no of solubilizing the pyrolysis oil. Suitable stripping solvents include, but are not limited to, alcohols. Suitable alcohols include, but are not limited to, methanol, ethanol, propanol, butanol, or combinations thereof.

There is some evidence that the APO may be more stable in methanol or ethanol than in n-butyl acetate alone. This could permit operation at higher temperatures (and thus less severe vacuum conditions), as well as for longer run lengths in the downstream hydrotreating steps. Both of these would be economic benefits to the process, helping the end user ensure profitability.

Ethanol is a greener solvent to use for n-butyl acetate recovery as it is already extensively produced from biomass. This is important, as a significant amount of the alcohol is sent to the hydrotreater to stabilize the APO and could be converted into products in the process. In this scenario, using bio-ethanol will permit more tax credits to be gained from the end transportation fuels as some tax credits are based on carbon intensity of the process (Low Carbon Fuel Standard (LCFS), for example). Moreover, ethanol would convert to ethane in the hydrotreater (rather than methanol converting to methane). Ethane is easier to separate from hydrogen than methane, permitting lower purge and make-up hydrogen rates. Finally, ethanol comes with a higher flash point than methanol, increasing the safety of the overall process.

Propanol and butanol are less available and, consequently, are less likely to be used.

The operating conditions for the stripping column 110 are chosen so that the organic solvent has an appreciable vapor pressure, for example, greater than 1 kPa. Similar to the action of steam in a steam stripper, the stripping vapor drives the gaseous organic solvent to the top of the column which permits more organic solvent to evaporate. By controlling the rate and temperature of the stripping vapor, the amount of organic solvent removed from the APO can be precisely controlled. The resulting APO has some stripping solvent in it due to the stripping solvent condensation providing heat for the organic solvent vaporization.

The operating conditions for the stripping column depend on the stripping solvent being used, and can be determined by those of ordinary skill in the art. For example, the stripping column may be operated at a temperature in the range of 50 to 80° C. and a pressure in a range of 5 to 110 kPa. Suitable operating conditions for methanol include a temperature in the range of 50 to 80° C. and a pressure in the range of 15 to 110 kPa. Suitable operating conditions for ethanol include a temperature in the range of 50 to 80° C. and a pressure in the range of 5 to 50 kPa.

The stripping column bottoms stream 120, containing less than 10 wt % of the extraction solvent, or less than 5 wt %, and up to more than 50% of the stripping solvent, is sent to a separator 125 where a desired amount of the stripping solvent 130 can be recovered and recycled back to the stripping column 110. The conditions in the separator 125 can be tailored to impact the stripping solvent recovery leaving from 5-30 wt % stripping solvent in the separator bottoms. The goal is to leave enough stripping solvent in the APO stream 135 to provide a benefit in the downstream hydrotreater but not too much that it negatively impacts the project economics. Suitable separators include, but are not limited to, one or more of a flash drum, a distillation column, a stripping column, or combinations thereof, as well as other known separation unit operations.

The operating conditions for the separator depend on the type of separator and the stripping solvent being used, and can be determined by those of ordinary skill in the art. For example, a flash drum may be operated at a temperature in a range of 50 to 100° C. and a pressure in a range of 5 to 110 kPa for methanol or ethanol.

The stripping column overhead 140, containing greater than 80% of the organic solvent, or greater than 85%, or greater than 90%, and a majority of the stripping solvent fed to 110, may be sent to a recovery column 145 to separate it into a stripping solvent stream 150 and an organic extraction solvent stream 155. The recovery column could be a distillation column, for example.

The operating conditions for the recovery column depend on the organic solvent and the stripping solvent being used, and can be determined by those of ordinary skill in the art. For example, the recovery column may be operated at a temperature in a range of 60 to 150° C. and a pressure in a range of 100 to 500 kPa. Suitable operating conditions for methanol and n-butyl acetate include a temperature in the range of 60 to 135° C. and a pressure in the range of 100 to 500 kPa. Suitable operating conditions for ethanol and n-butyl acetate include a temperature in the range of 75 to 150° C. and a pressure in the range of 100 to 500 kPa.

The stripping solvent stream 150 can be recycled back to the stripping column 110. The recycle could be all or a portion of the stripping solvent stream 150. For example, a purge stream could be removed, or a portion could be sent for use elsewhere.

The organic extraction solvent stream 155 can be recycled back to the upstream pyrolysis separation process (not shown). The recycle could be all or a portion of the organic extraction solvent stream 155. For example, a purge stream could be removed, or a portion could be sent for use elsewhere.

The mass ratio of the extracted phase feed stream 115 to the stripping vapor feed stream 105 may be in the range of 2:1 to 1:3, or 1:1 to 1:2.

A condenser (not shown) would be included on the stripping column overhead to maximize the stripping solvent recovery of the overall process and generate a column reflux, if desired. Cooling media for the condenser could include air, cooling water, or chilled water with the selection being dictated by an economic evaluation comparing solvent loss to the vapor and size of vacuum equipment required versus the cost of the cooling media chosen.

EXAMPLES

The process shown in the FIGURE was modeled using the following conditions.

Example 1

Stripping column: 10 stages, 300 mbar
Stripping vapor feed stream: 100% wt % methanol at 65° C.
Extracted phase feed stream: 54% wt % APO/46% wt % n-butyl acetate at 65° C.
Ratio of stripping vapor feed stream:extracted phase feed stream: about 1:1 on a mass basis
Stripping column bottoms stream: 65° C.
Flash drum: 65° C., 185 mbar
Separator vapor stream: 95 wt % methanol
Separator liquid stream: 10 wt % methanol, 0.4 wt % n-butyl acetate, remainder—APO
Stripping column overhead: 95° C.
Second column: 28 stages, 10 psig
Second column overhead stream: 98% recovery of methanol
Second column bottom stream: 96% recovery of n-butyl acetate from the extracted phase feed stream
Additional recovery is possible if needed by adding more stages, for example, to the stripping column.

Example 2

Stripping Column: 11 stages, 120 mbar
Stripping vapor feed stream: 92 wt % ethanol, 6 wt % water, remainder APO and n-butyl acetate at 65 deg C.
Extracted phase feed stream: 54 wt % APO/46 wt % n-butyl acetate at 54 deg C.
Ratio of stripping vapor feed stream:extracted phase feed stream: about 1.6:1 on a mass basis
Stripping column bottoms stream: 53 deg C.
Flash Drum: 65 deg C., 295 mbar
Separator vapor stream: 88 wt % ethanol
Separator liquid stream: 20 wt % ethanol, 5 wt % n-butyl acetate, remainder APO
Stripping column overhead: 86 deg C.
Second column: 30 stages, 5 psig
Second column overhead stream: 93 wt % ethanol
Second column bottom stream: 98% recovery of n-butyl acetate from the extracted phase feed stream Example 3

Stripping Column: 11 stages, 295 mbar
Stripping vapor feed stream: 92 wt % ethanol, 6 wt % water, remainder APO and n-butyl acetate at 65 deg C.
Extracted phase feed stream: 54 wt % APO/46 wt % n-butyl acetate at 55 deg C.
Ratio of stripping vapor feed stream:extracted phase feed stream: about 1.75:1 on a mass basis
Stripping column bottoms stream: 57 deg C.
Flash Drum: 65 deg C., 295 mbar
Separator vapor stream: 88 wt % ethanol
Separator liquid stream: 20 wt % ethanol, 5 wt % n-butyl acetate, remainder APO
Stripping column overhead: 90 deg C.
Second column: 30 stages, 8 psig
Second column overhead stream: 93 wt % ethanol
Second column bottom stream: 98% recovery of n-butyl acetate from the extracted phase feed stream By the term "about," we mean within 10% of the value, or within 5%, or within 1%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

SPECIFIC EMBODIMENTS

While the following is described in conjunction with specific embodiments, it will be understood that this description is intended to illustrate and not limit the scope of the preceding description and the appended claims.

A first embodiment of the invention is a process for recovery of pyrolysis oil extraction solvent comprising introducing an extracted phase feed stream comprising pyrolysis oil and an organic solvent to a stripping column through an extracted phase feed stream inlet; introducing a stripping vapor feed stream comprising a stripping solvent to the stripping column at a point below the extracted phase feed stream inlet forming a stripping column overhead stream comprising the organic solvent and the stripping solvent and a stripping column bottom stream comprising the pyrolysis oil and the stripping solvent. An embodiment of the invention is one, any or all of prior embodiments in this paragraph up through the first embodiment in this paragraph further comprising separating the stripping column overhead stream in a recovery column into a recovery column overhead stream comprising the stripping solvent and a recovery column bottom stream comprising the organic solvent. An embodiment of the invention is one, any or all of prior embodiments in this paragraph up through the first embodiment in this paragraph further comprising separating the stripping column bottom stream in a separator into a separator vapor stream comprising the stripping solvent and a separator liquid stream comprising the pyrolysis oil. An embodiment of the invention is one, any or all of prior embodiments in this paragraph up through the first embodiment in this paragraph further comprising recycling the recovery column overhead stream to the stripping column as a portion of the stripping vapor feed stream; or recycling the recovery column bottom stream to a pyrolysis oil extraction process; or both. An embodiment of the invention is one, any or all of prior embodiments in this paragraph up through the first embodiment in this paragraph further comprising recycling the separator vapor stream to the stripping column as a portion of the stripping vapor feed stream. An embodiment of the invention is one, any or all of prior embodiments in this paragraph up through the first embodiment in this paragraph wherein the organic solvent comprises n-butyl acetate, ethyl acetate, propyl acetate, methyl isobutyl ketone, or combinations thereof. An embodiment of the invention is one, any or all of prior embodiments in this paragraph up through the first embodiment in this paragraph wherein the stripping solvent comprises methanol, ethanol, propanol, butanol, or combinations thereof. An embodiment of the invention is one, any or all of prior embodiments in this paragraph up through the first embodiment in this paragraph wherein the separator is a flash drum, a distillation column, a stripping column, or combinations thereof. An embodiment of the invention is one, any or all of prior embodiments in this paragraph up through the first embodiment in this paragraph wherein the flash drum is operated at a temperature in a range of 50 to 100° C. and a pressure in a range of 5 to 110 kPa. An embodiment of the invention is one, any or all of prior embodiments in this paragraph up through the first embodiment in this paragraph wherein the stripping column is operated at a temperature in a range of 50 to 80° C. and a pressure in a range of 5 to 110 kPa. An embodiment of the invention is one, any or all of prior embodiments in this paragraph up through the first embodiment in this paragraph wherein the recovery column is operated at a temperature in a range of 60 to 150° C. and a pressure in a range of 100 to 500 kPa. An embodiment of the invention is one, any or all of prior embodiments in this paragraph up through the first embodiment in this paragraph wherein a mass ratio of the extracted phase feed stream to the stripping vapor feed stream is in a range of 2:1 to 1:3.

A second embodiment of the invention is a process for recovery of pyrolysis oil extraction solvent comprising introducing an extracted phase feed stream comprising pyrolysis oil and an organic solvent to a stripping column through an extracted phase feed stream inlet; introducing a stripping vapor feed stream comprising a stripping solvent to the stripping column at a point below the extracted phase feed stream inlet forming a stripping column overhead stream comprising the organic solvent and the stripping solvent and a stripping column bottom stream comprising the pyrolysis oil and the stripping solvent; separating the stripping column bottom stream in a flash drum into a vapor stream comprising the stripping solvent and a liquid stream comprising the pyrolysis oil; and separating the stripping column overhead steam in a recovery column into a recovery column overhead stream comprising the stripping solvent and a recovery column bottom stream comprising the organic solvent. An embodiment of the invention is one, any or all of prior embodiments in this paragraph up through the second embodiment in this paragraph further comprising recycling the recovery column overhead stream to the stripping column as a portion of the stripping vapor feed stream; or recycling the vapor stream from the flash drum to the stripping column as a portion of the stripping vapor feed stream; or both. An embodiment of the invention is one, any or all of prior embodiments in this paragraph up through the second embodiment in this paragraph further comprising recycling the recovery column bottom stream to a pyrolysis oil extraction process. An embodiment of the invention is one, any or all of prior embodiments in this paragraph up through the second embodiment in this paragraph wherein the stripping solvent comprises methanol, ethanol, propanol, butanol, or combinations thereof. An embodiment of the invention is one, any or all of prior embodiments in this paragraph up through the second embodiment in this paragraph wherein the organic solvent comprises n-butyl acetate, ethyl acetate, propyl acetate, methyl isobutyl ketone, or combinations thereof. An embodiment of the invention is one, any or all of prior embodiments in this paragraph up through the second embodiment in this paragraph wherein the flash drum is operated at a temperature in a range of 50 to 100° C. and a pressure in a range of 5 to 110 kPa. An embodiment of the invention is one, any or all of prior embodiments in this paragraph up through the second embodiment in this paragraph wherein the stripping column is operated at a temperature in a range of 50 to 80° C. and a pressure in a range of 5 to 110 kPa; or the recovery column is operated at a temperature in a range of 60 to 150° C. and a pressure in a range of 100 to 500 kPa; or both. An embodiment of the invention is one, any or all of prior embodiments in this paragraph up through the second embodiment in this paragraph wherein a mass ratio of the extracted phase feed stream to the stripping vapor stream is in a range of 2:1 to 1:3.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A process for recovery of pyrolysis oil extraction solvent comprising:
   introducing an extracted phase feed stream comprising pyrolysis oil and an organic solvent to a stripping column through an extracted phase feed stream inlet; and
   introducing a stripping vapor feed stream comprising a stripping solvent to the stripping column at a point below the extracted phase feed stream inlet forming a stripping column overhead stream comprising the organic solvent and the stripping solvent and a stripping column bottom stream comprising the pyrolysis oil and the stripping solvent, wherein the stripping solvent comprises methanol, ethanol, propanol, butanol, or combinations thereof.

2. The process of claim 1 further comprising:
   separating the stripping column overhead stream in a recovery column into a recovery column overhead stream comprising the stripping solvent and a recovery column bottom stream comprising the organic solvent.

3. The process of claim 1 further comprising:
   separating the stripping column bottom stream in a separator into a separator vapor stream comprising the stripping solvent and a separator liquid stream comprising the pyrolysis oil.

4. The process of claim 2 further comprising:
   recycling the recovery column overhead stream to the stripping column as a portion of the stripping vapor feed stream; or
   recycling the recovery column bottom stream to a pyrolysis oil extraction process; or both.

5. The process of claim 3 further comprising:
   recycling the separator vapor stream to the stripping column as a portion of the stripping vapor feed stream.

6. The process of claim 1 wherein the organic solvent comprises n-butyl acetate, ethyl acetate, propyl acetate, methyl isobutyl ketone, or combinations thereof.

7. The process of claim 3 wherein the separator is a flash drum, a distillation column, a stripping column, or combinations thereof.

8. The process of claim 7 wherein the separator is a flash drum and wherein the flash drum is operated at a temperature in a range of 50 to 100° C. and a pressure in a range of 5 to 110 kPa.

9. The process of claim 1 wherein the stripping column is operated at a temperature in a range of 50 to 80° C. and a pressure in a range of 5 to 110 kPa.

10. The process of claim 2 wherein the recovery column is operated at a temperature in a range of 60 to 1 50° C. and a pressure in a range of 1 00 to 500 kPa.

11. The process of claim 1 wherein a mass ratio of the extracted phase feed stream to the stripping vapor feed stream is in a range of 2:1 to 1:3.

12. A process for recovery of pyrolysis oil extraction solvent comprising:
   introducing an extracted phase feed stream comprising pyrolysis oil and an organic solvent to a stripping column through an extracted phase feed stream inlet;
   introducing a stripping vapor feed stream comprising a stripping solvent to the stripping column at a point below the extracted phase feed stream inlet forming a stripping column overhead stream comprising the organic solvent and the stripping solvent and a stripping column bottom stream comprising the pyrolysis oil and the stripping solvent;
   separating the stripping column bottom stream in a flash drum into a vapor stream comprising the stripping solvent and a liquid stream comprising the pyrolysis oil; and
   separating the stripping column overhead steam in a recovery column into a recovery column overhead stream comprising the stripping solvent and a recovery column bottom stream comprising the organic solvent.

13. The process of claim 12 further comprising:
   recycling the recovery column overhead stream to the stripping column as a portion of the stripping vapor feed stream; or
   recycling the vapor stream from the flash drum to the stripping column as a portion of the stripping vapor feed stream; or both.

14. The process of claim 12 further comprising:
   recycling the recovery column bottom stream to a pyrolysis oil extraction process.

15. The process of claim 12 wherein the stripping solvent comprises methanol, ethanol, propanol, butanol, or combinations thereof.

16. The process of claim 12 wherein the organic solvent comprises n-butyl acetate, ethyl acetate, propyl acetate, methyl isobutyl ketone, or combinations thereof.

17. The process of claim 12 wherein the flash drum is operated at a temperature in a range of 50 to 100° C. and a pressure in a range of 5 to 110 kPa.

18. The process of claim 12 wherein:
   the stripping column is operated at a temperature in a range of 50 to 80° C. and a pressure in a range of 5 to 110 kPa; or
   the recovery column is operated at a temperature in a range of 60 to 150° C. and a pressure in a range of 100 to 500 kPa; or both.

19. The process of claim 1 wherein a mass ratio of the extracted phase feed stream to the stripping vapor stream is in a range of 2:1 to 1:3.

* * * * *